US012561752B2

(12) United States Patent
Gong

(10) Patent No.: US 12,561,752 B2
(45) Date of Patent: Feb. 24, 2026

(54) APPARATUS AND METHOD FOR A FRAMEWORK FOR GPU-DRIVEN DATA LOADING

(71) Applicant: Tencent America LLC, Palo Alto, CA (US)

(72) Inventor: Minmin Gong, Kirkland, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 143 days.

(21) Appl. No.: 18/085,367

(22) Filed: Dec. 20, 2022

(65) Prior Publication Data

US 2024/0202859 A1 Jun. 20, 2024

(51) Int. Cl.
*G06T 1/20* (2006.01)

(52) U.S. Cl.
CPC ...................................... *G06T 1/20* (2013.01)

(58) Field of Classification Search
CPC ................................... G06T 1/20; G06T 1/60
USPC ......................................................... 345/501
See application file for complete search history.

(56) References Cited

U.S. PATENT DOCUMENTS

| | | | | | |
|---|---|---|---|---|---|
| 8,396,122 | B1 * | 3/2013 | Taylor | ................. | H04N 19/436 |
| | | | | | 375/240.03 |
| 8,537,899 | B1 * | 9/2013 | Taylor | ................. | H04N 19/625 |
| | | | | | 382/250 |
| 9,311,721 | B1 * | 4/2016 | Loughry | ................... | G06T 1/20 |
| 12,223,682 | B2 * | 2/2025 | Junkins | ..................... | G06T 1/60 |
| 12,243,118 | B2 * | 3/2025 | Fontaine | ................. | G06F 9/547 |
| 2007/0291846 | A1 | 12/2007 | Hussain | | |
| 2008/0276262 | A1 * | 11/2008 | Munshi | ................. | G06F 9/4843 |
| | | | | | 717/140 |
| 2011/0063296 | A1 * | 3/2011 | Bolz | .................... | G06T 15/005 |
| | | | | | 345/426 |
| 2011/0109639 | A1 * | 5/2011 | Sreenivas | .............. | G09G 5/397 |
| | | | | | 345/538 |
| 2012/0320070 | A1 * | 12/2012 | Arvo | .................... | G06F 9/5033 |
| | | | | | 345/522 |
| 2014/0184606 | A1 * | 7/2014 | de Richebourg | ..... | G06T 11/001 |
| | | | | | 345/440 |
| 2015/0262385 | A1 | 9/2015 | Satoh et al. | | |

(Continued)

FOREIGN PATENT DOCUMENTS

JP        2015-176492 A        10/2015

OTHER PUBLICATIONS

International Search Report with Written Opinion issued in Application No. PCT/US2023/064531, mailed Jul. 7, 2023, 9 pages.

(Continued)

*Primary Examiner* — Prabodh M Dharia
(74) *Attorney, Agent, or Firm* — ARENTFOX SCHIFF LLP

(57) ABSTRACT

In a method of data loading at a computing device, data to load is identified at a graphics processing unit (GPU) based on execution of an application program. Data chunks of the identified data in encoded form are loaded via the GPU from a data storage device to a video memory associated with the GPU. The data chunks are decoded in parallel by using plural GPU thread groups in parallel to decode the data chunks. Each of the data chunks is decoded independently of other data chunks. Apparatus, device, and non-transitory computer-readable storage medium counterparts are also contemplated.

30 Claims, 6 Drawing Sheets

(56) References Cited

U.S. PATENT DOCUMENTS

| | | | |
|---|---|---|---|
| 2016/0055608 A1* | 2/2016 | Frascati | G06T 15/005 |
| | | | 345/522 |
| 2016/0366424 A1* | 12/2016 | Wu | H04N 19/172 |
| 2017/0091029 A1* | 3/2017 | Cho | G06F 3/064 |
| 2017/0124166 A1* | 5/2017 | Thomas | G06F 16/24568 |
| 2017/0318068 A1* | 11/2017 | Kikkeri Shivadatta | |
| | | | H04J 3/0632 |
| 2019/0129950 A1* | 5/2019 | Sarkar | G06F 3/0643 |
| 2021/0001220 A1* | 1/2021 | Cerny | G06T 1/20 |
| 2021/0184795 A1* | 6/2021 | Ibars Casas | H04W 88/08 |
| 2022/0036498 A1* | 2/2022 | Li | G06F 17/142 |
| 2022/0124335 A1 | 4/2022 | Dinu et al. | |
| 2022/0270203 A1 | 8/2022 | Tu et al. | |
| 2023/0244470 A1* | 8/2023 | Shimon | H04L 67/12 |
| | | | 717/172 |
| 2023/0336731 A1* | 10/2023 | Dinu | H04N 19/61 |
| 2024/0061943 A1* | 2/2024 | Durham | G06F 12/0646 |

OTHER PUBLICATIONS

Memory-mapped files, .NET fundamentals documentation, https://learn.microsoft.com/en-US/dotnet/standard/io/ memory-mapped-files, Dec. 14, 2022, pp. 1-10.

VK_EXT_external_memory_host(3) Manual p. https://registry.khronos.org/vulkan/specs/1.3-extensions/man/html/ VK_EXT_external_memory_host.html, pp. 1-4 Nov. 10, 2017.

VK_KHR_external_memory_fd(3) Manual p. https://registry.khronos.org/vulkan/specs/1.3-extensions/man/html/ VK_KHR_external_memory_fd.html, pp. 1-3 Oct. 21, 2016.

DirectStorage Overview, Game Development Kit documentation, https://learn.microsoft.com/en-US/gaming/gdk/ _content/gc/system/overviews/directstorage/directstorage-overview, Mar. 15, 2023, pp. 1-17.

Wikipedia contributors. "LZ77 and LZ78." Wikipedia, The Free Encyclopedia. Wikipedia, The Free Encyclopedia, Jan. 31, 2024. Web. Feb. 13, 2024, pp. 1-7.

Saher Odeh, et al., Merge Path - Parallel Merging Made Simple, Conference: Parallel and Distributed Processing Symposium Workshops & PhD Forum (IPDPSW), 2012 IEEE 26th International, May 2012, pp. 1-9.

Office Action received for Japanese Patent Application No. 2024-563945, mailed on Oct. 7, 2025, 12 pages (6 pages of English Translation and 6 pages of Original Document).

* cited by examiner

400

402

Identifying, at a GPU, data to load based on execution of an application program

404

Loading, via the GPU, data chunks of the identified data in encoded form a data storage device to a video memory associated with the GPU

406

Decoding the data chunks in parallel by using plural GPU thread groups in parallel to decode the data chunks

APPARATUS AND METHOD FOR A FRAMEWORK FOR GPU-DRIVEN DATA LOADING

TECHNICAL FIELD

The present disclosure relates generally to graphics processing units (GPUs), including one or more techniques for loading data at a computing device.

BACKGROUND

Computing devices often utilize a graphics processing unit (GPU), in combination with a central processing unit (CPU) to render graphical data for display or to perform non-graphical related functions that exploit the massive processing parallelism provided by the GPU. Such computing devices may include, for example, computer workstations, mobile phones such as smartphones, embedded systems, personal computers, tablet computers, and video game consoles. GPUs process instructions and/or data in a processing pipeline that includes one or more processing stages that operate together to execute processing commands for graphical and non-graphical related functions. A CPU may control the operation of the GPU by issuing one or more processing commands to the GPU. Modern day CPUs are typically capable of concurrently executing multiple applications, each of which may need to utilize the GPU during execution.

GPUs were first intended to improve graphic rendering, but the parallel computing nature of the GPU has been found beneficial for accelerating a range of processing applications. The ability to perform separate tasks in parallel as well as the modular architecture of modern GPUs means that for every graphics or non-graphical need, there may be a variety of ways that a solution can be designed. This enhanced the GPU capabilities by making them more flexible and programmable for purposes other than rendering. Today, GPU parallel computing is used for a wide range of different applications.

Architecturally, a CPU is composed of one or more cores with cache memory that can handle a few software threads at a time. This makes a CPU good for serial processing because the CPU can quickly execute a series of operations at a time. In contrast, a GPU may include hundreds of cores that may be able to handle thousands of threads simultaneously. This makes the GPU good for parallel processing because the GPU can handle thousands of operations at once. The hundreds of cores in the GPU are lower-powered and are better suited for running simple simultaneous calculations such as arithmetic. Accordingly, GPU parallel computing enables GPUs to break complex problems into thousands or millions of separate tasks and work them all out at once instead of one-by-one like a CPU would. This also makes GPUs more powerful than CPUs due to having more cores, more computing power, and therefore a higher potential for parallelism in computing.

Typically, a GPU waits for a CPU to load data from storage, decode the data, and transfer the decoded data to video memory for the GPU to perform its processing. However, with the increasing complexity of rendered content and the constraints of CPU performance, there has developed an increased need for improved graphics or computer processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

The present disclosure relates to methods and apparatuses of data loading at a computing device. An aspect of the subject matter described in this disclosure is implemented in a method of loading data at a computing device. The method includes identifying, at a GPU, data to load based on execution of an application program. The method also includes loading, via the GPU, data chunks of the identified data in encoded form from a data storage device to a video memory associated with the GPU. The method further includes decoding the data chunks in parallel by using plural GPU thread groups in parallel to decode the data chunks. Each of the data chunks is decoded independently of other data chunks.

Another further aspect of the subject matter described in this disclosure can be implemented in an apparatus for data loading at a computing device. The apparatus includes a graphics processing unit (GPU) that is configured to identify data to load based on execution of an application program. The GPU is also configured to load data chunks of the identified data in encoded form from a data storage device to a video memory associated with the GPU. The GPU is further configured to decode the data chunks in parallel by using plural GPU thread groups in parallel to decode the data chunks. Each of the data chunks is decoded independently of other data chunks.

Another further aspect of the subject matter described in this disclosure can be implemented in a non-transitory computer-readable storage medium storing instructions which when executed by at least one processor cause to processor to perform identifying, at a graphics processing unit (GPU), data to load based on execution of an application program. The processor is also configured to perform loading, via the GPU, data chunks of the identified data in encoded form from a data storage device to a video memory associated with the GPU. The processor is further configured to decode the data chunks in parallel by using plural GPU thread groups in parallel to decode the data chunks. Each of the data chunks is decoded independently of other data chunks.

Yet another further aspect of the subject matter described in this disclosure can be implemented in a device. The device includes a controller that is configured to identify data to load based on execution of an application program. The controller is also configured to load data chunks of the identified data in encoded form from a data storage device to a video memory associated with the GPU. The controller is further configured to decode the data chunks in parallel by using plural GPU thread groups in parallel to decode the data chunks. Each of the data chunks is decoded independently of other data chunks.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1A:
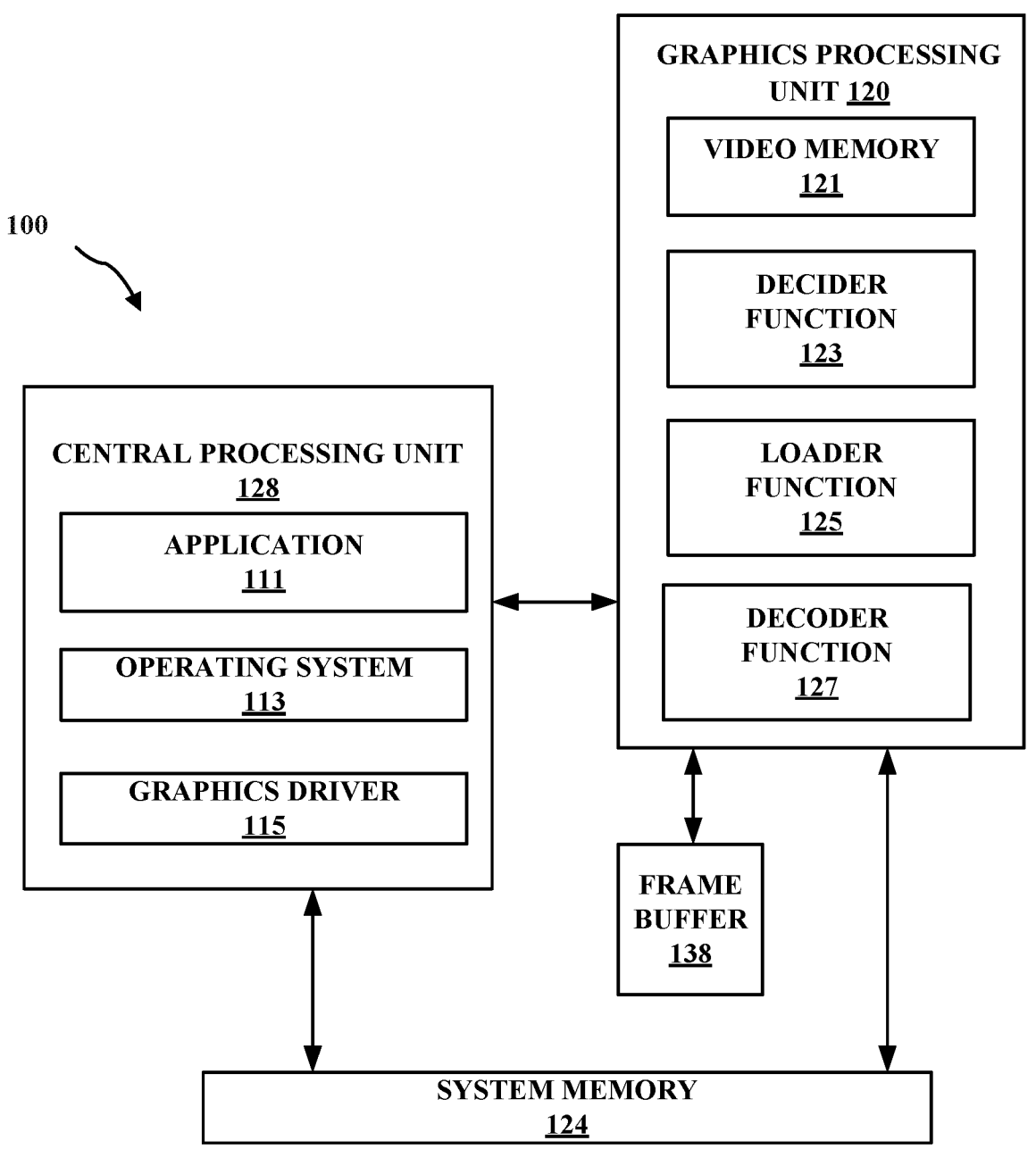
FIG. 1A is a block diagram that illustrates an example of a data loading system in accordance with one or more techniques of this disclosure.

The following description is directed to some exemplary aspects for the purposes of describing innovative aspects of this disclosure. However, a person having ordinary skill in the art will readily recognize that the teachings herein can be applied in a multitude of different ways.

Related systems have a framework for loading data using multiple processors. As an initial matter, data may be any block of data that will be consumed in a runtime process. For instance, the data may be video data, mesh data, texture data, machine learning training data, text data, or the like. In other words, the data may be any type of data that may benefit from parallel processing. In related systems, the GPU may request a CPU to load data from storage and decode the data into a form that the GPU may consume before the decoded or decompressed data can be transferred to video memory for GPU usage. However, this process creates a CPU bottleneck which slows the process down due to the GPU and CPU exchange. In addition, the CPU bottleneck is exacerbated in mobile devices because in mobile devices the CPU consumes a significant amount of processing power.

In related GPU-driven rendering pipelines, the GPU receives the data it needs for rendering by requesting the CPU to load the video data from storage and to decode the video data. However, this process stalls the GPU pipeline and slows rendering. There are many related systems with a data loading framework used for rendering graphics. Normally, compressed data are loaded into system memory and decompressed by the CPU before being sent to the GPU, which adds to load times.

As an example, a first related system may load files to memory with or without decoding. As another example, in a second related system, the video data must be compressed by Kraken algorithm which provides special APIs to load data. However, a dedicated chip must be used to decode the video data from the Kraken algorithm to GPU consumable content. As yet another example, in a third related system, only async loading is available and there is no encoding or decoding portion. The third related system may also have a new API to map storage to memory, which will require modifying the drive and OS and is not practical on mobile devices.

Another fourth related system may include a fast resource loading to stream data to textures and buffer directly from storage using asynchronous input/output (I/O) Application Programming Interfaces (APIs). Yet another fifth related system may transfer data between a GPU and other devices in the data center. However, both the fourth and fifth related systems cannot work on multiple platforms and multiple hardware. In addition, the above-mentioned related systems generally have either one fixed decompression algorithm or no decompression algorithm at all. This means that the related frameworks are not able to reduce bandwidth by customizing decompression algorithms to different scenarios or employing different decoding for different types of data. In a real-world application, different scenarios may have their best suitable compression techniques.

Aspects of the present disclosure utilize a cross-platform GPU-driven data loading framework that can be used in a desktop, mobile, console, server, or the like. In addition, there is no need to modify or use a new operating system (OS), new application programming interface (API), or new hardware to implement the disclosed techniques. The framework off-loads processes typically performed by a CPU to being performed on a GPU to lower power consumption and increasing performance by bypassing the CPU bottleneck. The data may also be kept in a compressed form until it is ready to be consumed by the GPU, which also reduces bandwidth when transferring data and further lowers the power consumption.

Aspects of the present disclosure utilize a flexible framework such that there is no need to focus on specific algorithms. Instead, the GPU-driven data loading framework provides the flexibility to customize encoding/decoding algorithms according to different scenarios. This allows developers to utilize customized decoding algorithms to create WARP-based parallel building blocks rather than starting from scratch. Unlike related GPU programs that operate in a block, these WARP-based building blocks for compression or decompression algorithms are optimized for running in the WARP to modify the serial compression or decompressions such that those algorithms may be used in parallel by the GPU.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatuses and methods. These apparatuses and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing circuitry). One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

As an initial matter, it should be noted that the term "GPU" as used herein does not necessarily imply a processing unit used only for graphics processing. To the contrary, the GPUs described herein are parallel processing accelerators. While a CPU typically consists of a few cores optimized for sequential serial processing, a GPU typically has a massively parallel architecture that may include thousands of smaller, more efficient computing cores designed for handling multiple tasks simultaneously. This allows GPUs to be used for many purposes beyond graphics, including to accelerate high performance computing, deep learning and artificial intelligence, analytics and other processing applications.

Parallel architecture also makes GPUs ideal for deep learning and neural networks since GPUs perform a large number of simultaneous calculations, thereby reducing the time it takes to train neural networks from days using conventional CPU technology to hours. As described here, each GPU may be used for any advanced processing task and will be particularly useful for complex tasks that benefit from massively parallel processing.

This disclosure includes techniques for data loading at a computing device by utilizing a framework to load GPU-driven data with minimal CPU involvement. Aspects of this disclosure offload the loader and decoder processes typically performed in serial by a CPU to be performed in parallel by the GPU. With this framework, the GPU may directly load data from storage to video memory and decode them on the GPU. In addition, since the data is kept in a compressed form until consumption by the GPU, the bandwidth for transferring is reduced which further lowers the power consumption. The encoding and decoding algorithm may also be customizable with no requirements to modify existing operating systems (OS), APIs, or hardware. Since the CPU is bypassed, the disclosed data loading framework requires less power consumption and provides faster processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a frame buffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Related systems load data at a computing device utilizing processes performed by both a CPU and GPU. The CPU initially loads data from a disc or storage, decodes, and optionally decompresses the loaded data into a form that the GPU may consume, and then sends the decoded or decompressed data to a GPU memory. However, in mobile devices, the CPU consumes a significant amount of power and may be slow due to the CPU processing bottleneck. The processing pipeline would be much faster and require less power consumption if the entire loading process can be performed directly by a GPU with minimal CPU involvement.

Accordingly, embodiments of the present disclosure include a method of data loading at a computing device and an apparatus to implement a framework for data loading at a computing device. While rendering video data for visual representation is used as an example, it is noted that aspects of the present disclosure may be applied to loading any data that is used in a runtime process by a computing device and can benefit from parallel processing. With this framework, a GPU may load data from storage to video memory and decode the data with minimal CPU involvement. The subject matter described herein can be implemented to realize one or more benefits or advantages. For instance, by moving traditional roles performed by the CPU such as loading and decoding to the GPU, the embodiment allows for maximizing performance, minimizing the bandwidth and lowers power consumption. In addition, the embodiment may be implemented without modification to existing OS, API, or hardware. The framework also utilizes general compression and decompression algorithm such that the framework may employ different decoding for different types of data.

FIG. 1A is a block diagram that illustrates an example of a data loading system 100 configured to implement one or more techniques of this disclosure. The data loading system 100 includes a CPU 128, a GPU 120, and a system memory 124 configured to load data according to an exemplary aspect. CPU 128 may execute software application 111, OS 113, and graphics driver 115. Moreover, system memory 124 may include indirect buffers that store the command streams for rendering primitives as well as secondary commands that are to be executed by GPU 120. GPU 120 may include video memory 121 that may be "on-board" with GPU 120 that includes a decider function 123, a loader function 125, and a decoder function 127. As described in more detail with respect to FIG. 1B, the components of data loading system 100 may be part of a device, including, but are not limited to, video devices, media players, set-top boxes, wireless handsets such as mobile telephones and so-called smartphones, personal digital assistants (PDAs), desktop computers, laptop computers, gaming consoles, video conferencing units, tablet computing devices, and the like.

CPU 128 may be coupled to one or more GPUs. GPU 120 may include a processing unit configured to perform graphics related functions such as generation and output of graphics data for presentation on a display, as well as perform non-graphics related functions that exploit the processing parallelism provided by GPU 120. Because GPU 120 may provide general-purpose processing capabilities in addition to graphics processing capabilities, GPU 120 may also be referred to as a general-purpose GPU (GP-GPU). Examples of CPU 128 and GPU 120 include, but are not limited to, a digital signal processor (DSP), a general-purpose microprocessor, application specific integrated circuit (ASIC), field programmable logic array (FPGA), or other equivalent integrated or discrete logic circuitry. In some examples, GPU 120 may be a microprocessor designed for specific usage such as providing massive parallel processing for processing graphics, as well as for executing non-graphics related applications. Furthermore, although CPU 128 and GPU 120 are illustrated as separate components, aspects of this disclosure are not so limited and can be, for example, implemented in a common integrated circuit (IC).

Software application 111 that executes on CPU 128 may include one or more graphics rendering instructions that instruct CPU 128 to cause the rendering of graphics data to a display (not shown in FIG. 1A). In some examples, the graphics rendering instructions may include software instructions that may conform to a graphics API. In order to process the graphics rendering instructions, CPU 128 may issue one or more graphics rendering commands to GPU 120 (e.g., through graphics driver 115) to cause GPU 120 to perform some or all of the rendering of the graphics data. In some examples, the graphics data to be rendered may include a list of graphics primitives, e.g., points, lines, triangles, quadrilaterals, triangle strips, etc.

GPU 120 may be configured to perform graphics operations to render one or more graphics primitives to a display. Accordingly, when one of the software applications executing on CPU 128 requires graphics processing, CPU 128 may provide graphics commands and graphics data to GPU 120 for rendering to the display. The graphics data may include, e.g., drawing commands, state information, primitive information, texture information, etc. GPU 120 may, in some instances, be built with a highly parallel structure that provides more efficient processing of complex graphic-related operations than CPU 128. For example, GPU 120 may include a plurality of processing elements that are configured to operate on multiple vertices or pixels in a parallel manner.

GPU 120 may process data locally using local storage (i.e., video memory 121), instead of host memory or system memory. This allows GPU 120 to operate in a more efficient manner by eliminating the need of GPU 120 to read and write data via, e.g., a shared bus, which may experience heavy bus traffic. Video memory 121 may include one or more volatile or non-volatile memories or storage devices, e.g., random access memory (RAM), static RAM (SRAM), dynamic RAM (DRAM), and one or more registers.

The video memory 121 may also be directly used by a decider function 123, a loader function 125, and a decoder function 127. The decider function 123 may be configured to identify data to load based on execution of an application program. The loader function 125 may be configured to load, via the GPU, data chunks of the identified data in encoded form from a data storage device to a video memory (e.g., the video memory 121) associated with the GPU. The decoder function 127 may be configured to decode the data chunks in parallel by using plural GPU thread groups in parallel to decode the data chunks. In some aspects, the processors that perform the above-described functions may be general processors (e.g., CPU).

CPU 128 and/or GPU 120 may store rendered image data in a frame buffer 138, which may be an independent memory or may be allocated within system memory 124. A display processor may retrieve the rendered image data from frame buffer 138 and display the rendered image data on a display.

System memory 124 may be a memory in the device and may be external to CPU 128 and GPU 120, i.e., off-chip with respect to CPU 128, and off-chip with respect to GPU 120. System memory 124 may store applications that are executed by CPU 128 and GPU 120. Furthermore, system memory 124 may store data upon which the executed applications operate, as well as the data that result from the application.

System memory 124 may store program modules, instructions, or both that are accessible for execution by CPU 128, and/or data for use by the programs executing on CPU 128. For example, system memory 124 may store a window manager application that is used by CPU 128 to present a graphical user interface (GUI) on a display. In addition, system memory 124 may store user applications and application surface data associated with the applications. As explained in detail below, system memory 124 may act as a device memory for GPU 120 and may store data to be operated on by GPU 120 as well as data resulting from operations performed by GPU 120. For example, system memory 124 may store any combination of texture buffers, depth buffers, stencil buffers, vertex buffers, frame buffers, or the like.

Examples of system memory 124 include, but are not limited to, a random-access memory (RAM), a read only memory (ROM), or an electrically erasable programmable read-only memory (EEPROM), or any other medium that can be used to carry or store desired program code in the form of instructions or data structures and that can be accessed by a computer or a processor. As one example, system memory 124 may be removed from the device, and moved to another device. As another example, a storage device, substantially similar to system memory 124, may be inserted into the device.

Figure 1B:
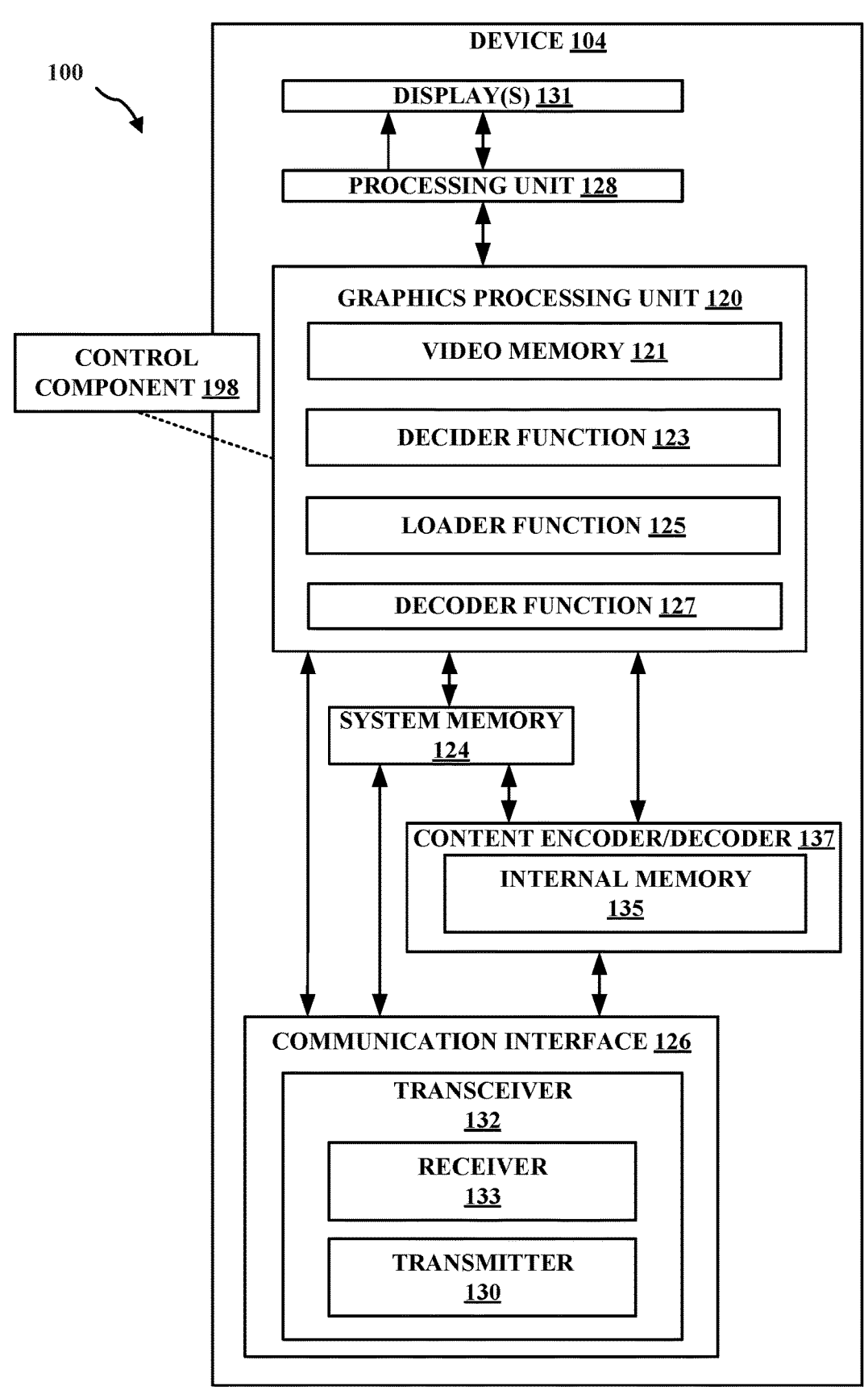
FIG. 1B is a block diagram that illustrates an example of a data loading system in accordance with one or more techniques of this disclosure.

FIG. 1B is a detailed block diagram that illustrates an example of a data loading system 100 configured to implement one or more techniques of this disclosure. It is noted that the data loading system 100 shown in FIG. 1B may correspond to the data loading system of FIG. 1A. In this regard, the data loading system 100 of FIG. 1B includes a CPU 128, a GPU 120, and a system memory 124.

As further shown, the data loading system 100 includes a device 104 that may include one or more components configured to perform one or more techniques of this disclosure. In the example shown, the device 104 may include a GPU 120, a content encoder/decoder 137, and system memory 124. In some aspects, the device 104 can include a number of additional components, e.g., a communication interface 126, a transceiver 132, a receiver 133, and a transmitter 130, and one or more displays 131. Reference to the display 131 may refer to the one or more displays 131. For example, the display 131 may include a single display or multiple displays. The display 131 may include a first display and a second display. In further examples, the results of the graphics processing may not be displayed on the device, e.g., the displays 131 may not receive any frames for presentment thereon. Instead, the frames or graphics processing results may be transferred to another device. In some aspects, this can be referred to as hybrid-rendering.

The GPU 120 includes video memory 121. The GPU 120 may be configured to perform graphics processing or non-graphics processing. The GPU 120 may be configured to perform identifying data to load based on execution of an application program, loading data chunks of the identified data in encoded form from a data storage video to a video memory (e.g., video memory 121) associated with the GPU, and decoding the data chunks in parallel by using plural GPU thread groups in parallel to decode the data chunks. The content encoder/decoder 137 may include an internal memory 135. In some examples, the device 104 may include a display processor, such as the CPU 128, to perform one or more display processing techniques on one or more frames generated by the GPU 120 before presentment by the one or more displays 131 as described above. The CPU 128 may be configured to perform display processing. The one or more displays 131 may be configured to display or otherwise present frames processed by the CPU 128. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the GPU 120 and the content encoder/decoder 137, such as system memory 124 as described above, may be accessible to the GPU 120 and the content encoder/decoder 137. For example, the GPU 120 and the content encoder/decoder 137 may be configured to read from and/or write to external memory, such as the system memory 124. The GPU 120 and the content encoder/decoder 137 may be communicatively coupled to the system memory 124 over a bus. In some examples, the GPU 120 and the content encoder/decoder 137 may be communicatively coupled to each other over the bus or a different connection.

The content encoder/decoder 137 may be configured to receive graphical content or data from any source, such as the system memory 124 and/or the communication interface 126. The system memory 124 may be configured to store received encoded or decoded graphical content or data. The content encoder/decoder 137 may be configured to receive encoded or decoded graphical content or data, e.g., from the system memory 124 and/or the communication interface 126, in the form of encoded pixel data or encoded data. The content encoder/decoder 137 may be configured to encode or decode any graphical content or data.

The video memory 121 or the system memory 124 may be a non-transitory computer-readable storage medium according to some examples. The term "non-transitory" may indicate that the storage medium is not embodied in a carrier wave or a propagated signal. However, the term "non-transitory" should not be interpreted to mean that video memory 121 or the system memory 124 is non-movable or that its contents are static. As one example, the system memory 124 may be removed from the device 104 and moved to another device. As another example, the system memory 124 may not be removable from the device 104.

The GPU (or processing circuitry) may be configured to perform graphics processing or non-graphics processing according to the exemplary techniques as described herein. In some examples, the GPU 120 may be integrated into a motherboard of the device 104. In some examples, the GPU 120 may be present on a graphics card that is installed in a port in a motherboard of the device 104, or may be otherwise incorporated within a peripheral device configured to interoperate with the device 104. The GPU 120 may include one or more processors, such as one or more microprocessors, GPUs, ASICs, FPGAs, ALUs, DSPs, discrete logic, software, hardware, firmware, other equivalent integrated or discrete logic circuitry, or any combinations thereof. If the techniques are implemented partially in software, the GPU 120 may store instructions for the software in a suitable, non-transitory computer-readable storage medium and may execute the instructions in hardware using one or more processors to perform the techniques of this disclosure. Any of the foregoing, including hardware, software, a combination of hardware and software, etc., may be considered to be one or more processors.

In some aspects, the data loading system 100 can include a communication interface 126. The communication interface 126 may include a receiver 133 and a transmitter 130. The receiver 133 may be configured to perform any receiving function described herein with respect to the device 104. Additionally, the receiver 133 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 133 and the transmitter 130 may be combined into a transceiver 132. In such examples, the transceiver 132 may be configured to perform any receiving function and/or transmitting function described herein with respect to the device 104.

Referring again to FIG. 1B, in certain aspects, the device 104 may include a control component 198 that is configured to control a processor (e.g., GPU 120) to identify data to load based on execution of an application program. Moreover, the control component 198 can also be configured to control the processor to load data chunks of the identified data in encoded form from a data storage device to a video memory (e.g., 121) associated with the GPU. In addition, the control component 198 can be further configured to control the processor to decode the data chunks in parallel by using plural GPU thread groups in parallel to decode the data chunks.

As described herein, a device, such as the device 104, may refer to any device, apparatus, or system configured to perform one or more techniques described herein. For example, a device may be a server, a client device, a computer (e.g., a personal computer), a desktop computer, a laptop computer, a tablet computer, a computer workstation, or a mainframe computer, a phone, a smart phone, a video game platform or console, a handheld device (e.g., a portable video game device or a personal digital assistant (PDA)), a wearable computing device, e.g., a smart watch, an augmented reality device, a virtual reality device, a display or display device, a television, a television set-top box, a network device, a digital media player, a video streaming device, a content streaming device, an in-car computer, or any other device configured to perform one or more techniques described herein. Processes herein may be described as performed by a particular component, e.g., a GPU, but, in further embodiments, can be performed using other processing components configured to perform the described processes.

Figure 2A:
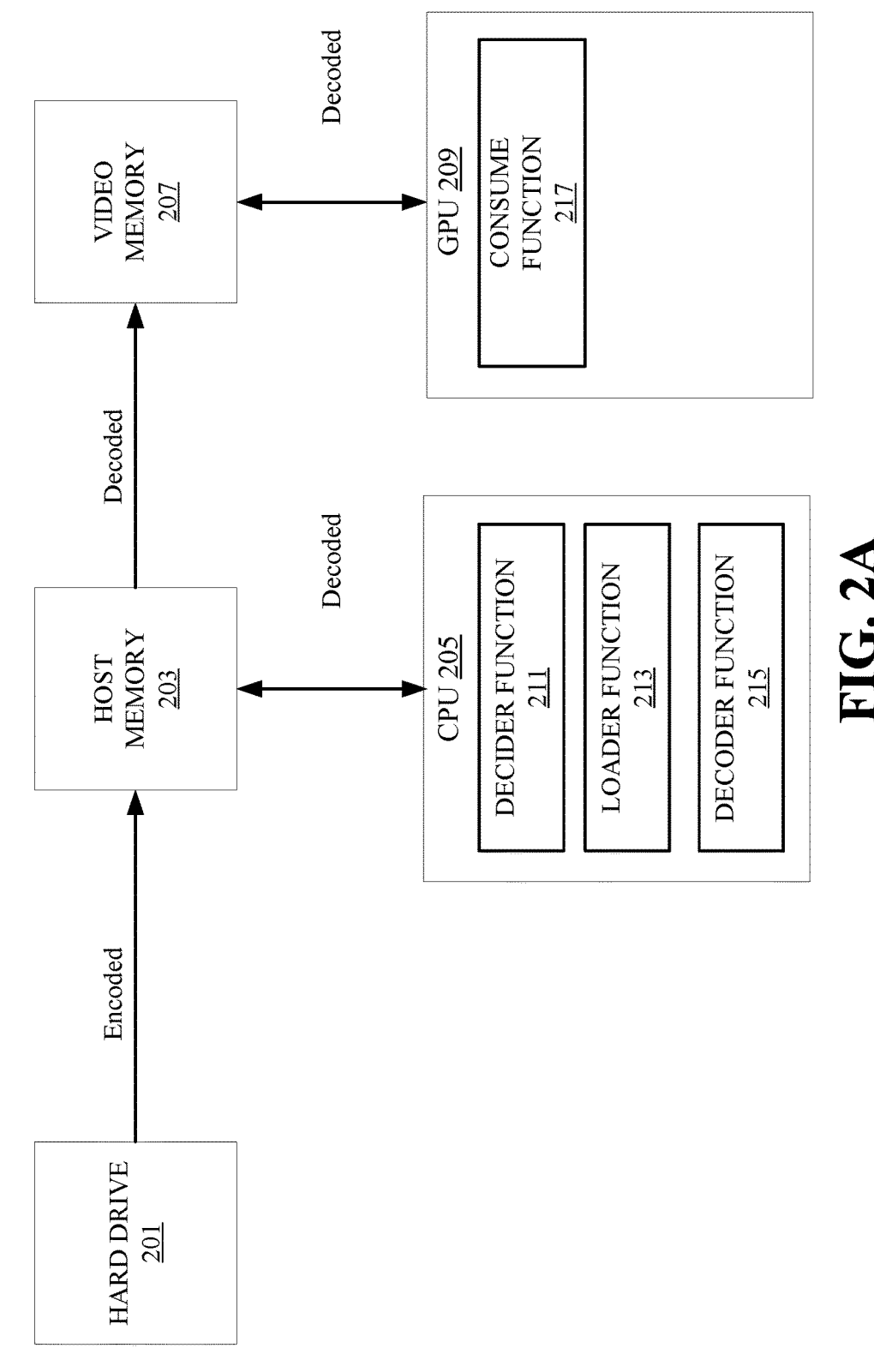
FIG. 2A illustrates an example diagram of a data loading pipeline handled by multiple processors.

FIG. 2A illustrates an example diagram of a data loading pipeline handled by multiple processors. Specifically, FIG. 2A shows the roles of and interaction between multiple processors during the life cycle of data. As mentioned above, data may be any block of data that will be consumed in a runtime process. As shown in FIG. 2A, the processing pipeline 200a includes at least a hard drive 201, a host memory 203, a CPU 205, a video memory 207, and a GPU 209.

In related systems, the CPU 205 performs a decider function 211, a loader function 213, and a decoder function 215 and the GPU 209 performs a consume function 217. The decider function 211 is configured to determine what data to load. The loader function 213 is configured to read and load the data to memory. The decoder function 215 is configured to decode the data. The consume function 217 is configured to consume the data.

In the processing pipeline 200a, the GPU 209 requests the CPU 205 to load data from the hard drive 201. The data is decoded by the CPU 205 and sent to the host memory 203. The CPU 205, and the video memory 207 may then access the decoded data from the host memory 203. The process of the GPU requesting the CPU to load the data and then waiting for the CPU to decode the data creates a bottleneck while the GPU is waiting for the data.

Figure 2B:
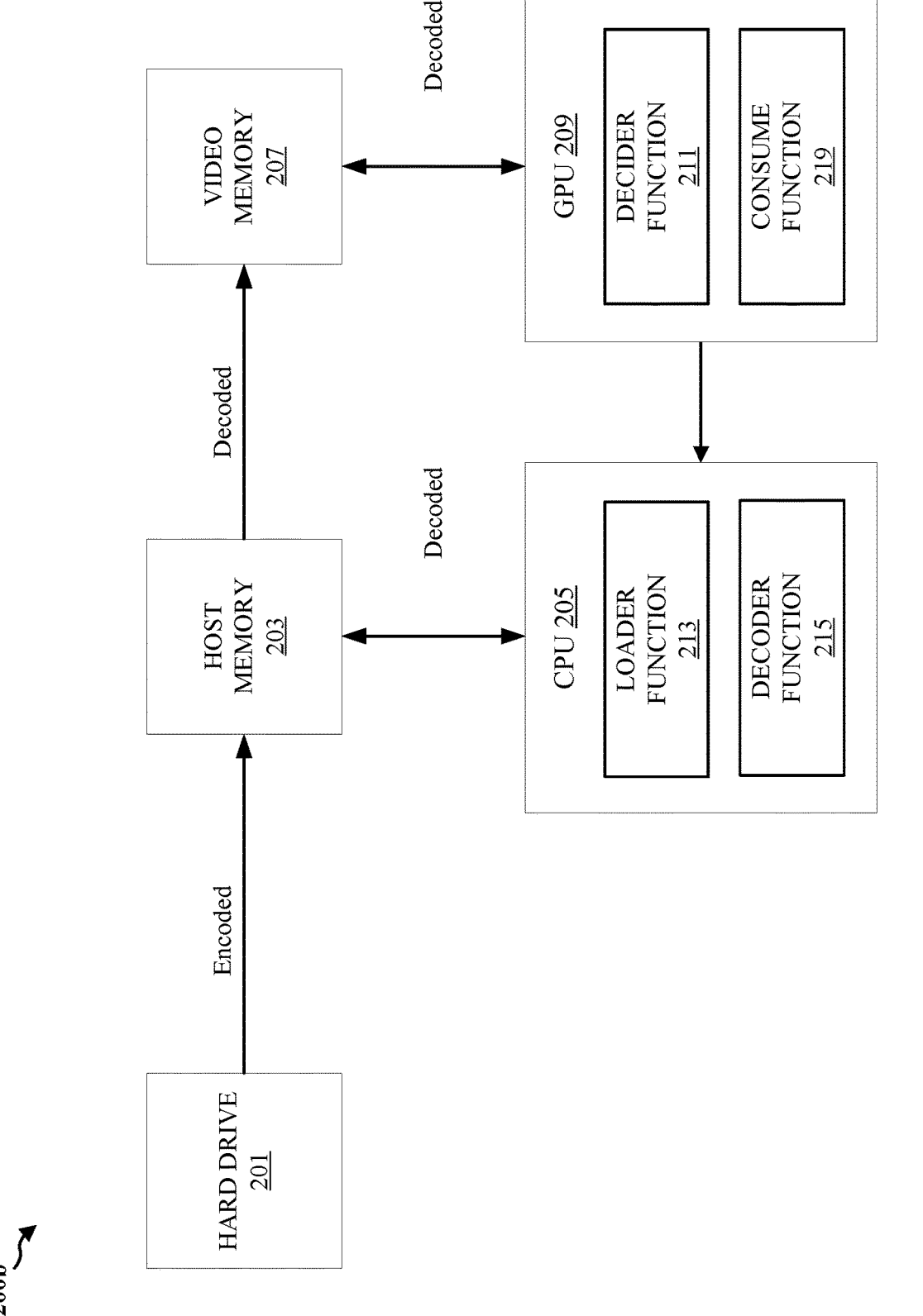
FIG. 2B illustrates an example diagram of a GPU-driven rendering pipeline.

FIG. 2B illustrates an example diagram of a GPU-driven rendering pipeline handled by multiple processors. Specifically, FIG. 2B shows the roles of and interaction between multiple processors during the life cycle of a video data. As shown in FIG. 2B, the processing pipeline 200b includes at least a hard drive 201, a host memory 203, a CPU 205, a video memory 207, and a GPU 209.

In a GPU-driven rendering pipeline, the GPU 209 determines what data it needs for rendering and requests the CPU 205 to load the data from storage and decode the data. In contrast to the processing pipeline 200a shown in FIG. 2A, the processing pipeline 200b moves the role of the decider function 211 to the GPU 209. This allows the GPU 209 to make the decision about what to load based on a scene and view angle. The decision is then read back to the CPU 205 to perform the loader function 213 and the decoder function 215. Finally, the decoded data is transferred to the GPU to perform the consume function 219.

Generally, when the GPU 209 requests the CPU 205 to load data, processing the request causes a latency of 1-3 frames because the CPU 205 and the GPU 209 both run asynchronously and the data must be read back to the CPU 205 every time.

There are a few drawbacks to the processing pipelines 200a and 200b. First, the GPU 209 has to wait for the CPU to load and decode the data, which slows down the processing pipeline. Second, the performance power ratio of the CPU 205 is lower than the GPU 209, so requesting the CPU 205 to perform decoding consumes a significant amount of processing power. In addition, on Non-Unified Memory Architectures (NUMA), the bandwidth for transferring the decided data from host memory 203 to video memory 207 is also high, which adds to the power consumption.

Finally, GPU decompression algorithms focus on one type of data. For instance, mesh compression can only compress a mesh and then decompress to another mesh. Similarly, texture compression can only focus on texture data. There exists a need for a GPU that can perform compression and decompression that are applicable to different types of data.

Figure 3:
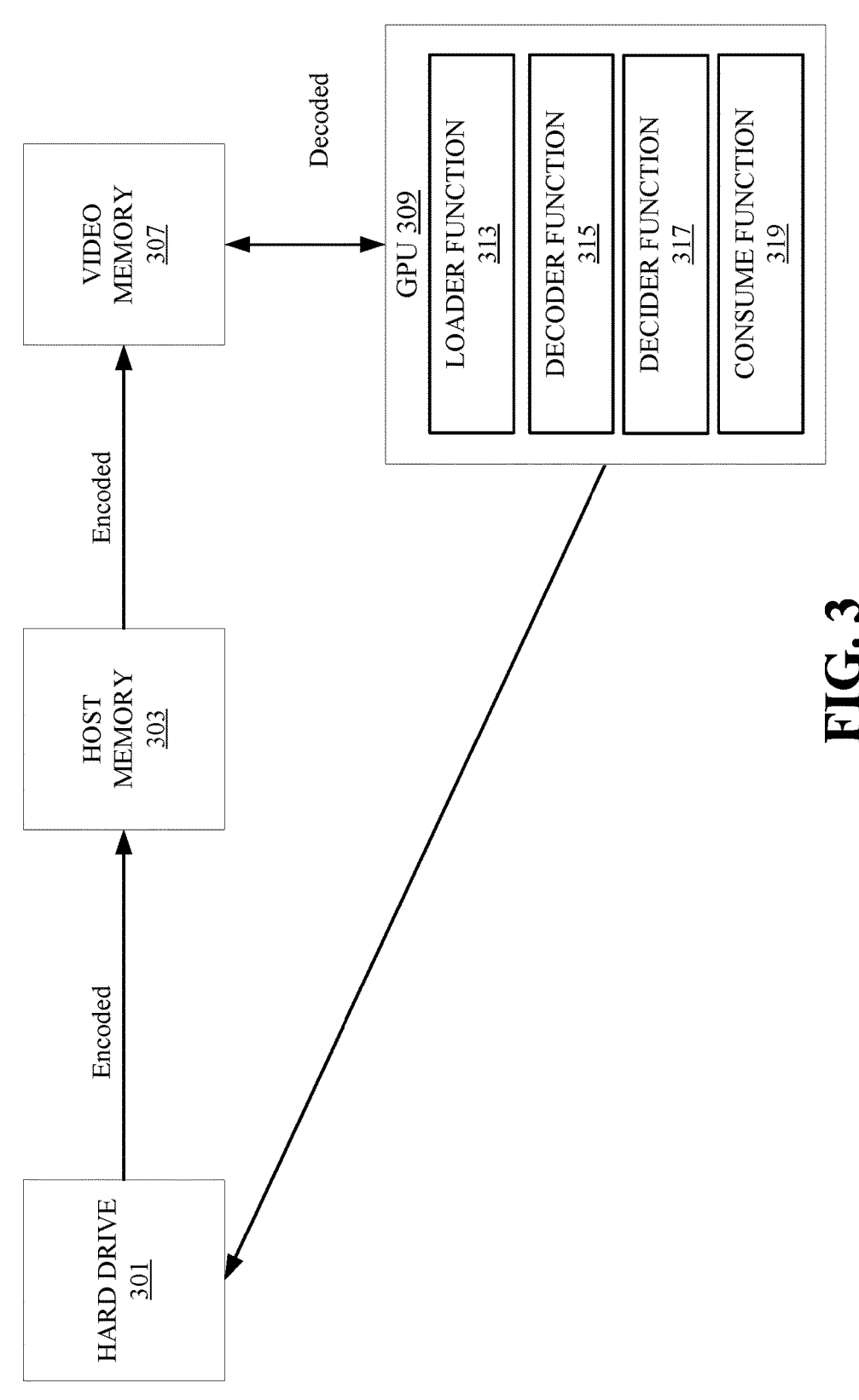
FIG. 3 illustrates an example diagram of a data loading pipeline handled by a GPU in accordance with one or more techniques of this disclosure.

FIG. 3 illustrates an example diagram of a data loading pipeline handled by a GPU in accordance with one or more techniques of this disclosure. Specifically, FIG. 3 shows an entire processing pipeline handled by the GPU 309. In contrast to the processing pipeline 200a from FIG. 2A and the processing pipeline 200b from FIG. 2B, the processing pipeline 300 shows the loader function 313, decoder function 315, decider function 317, and the consume function 319 all performed by the GPU 309.

Aspects of the present disclosure offload the loader function 213 and decoder function 215 from the CPU 205 to the GPU 309. This allows the entire processing pipeline to run on the GPU 309 with minimal CPU involvement. Accordingly, there may be no exchange between the GPU and CPU during the process of loading data for consumption in the GPU 309. Instead, the GPU may decode the data more efficiently in parallel and transfer the data in a compressed form. In addition, since the compressed data is read directly into the GPU memory and the GPU 209 decodes the data into a decompressed data for consumption there is no need to go back to the host memory 303 because the processes occurs in the video memory 307. Bypassing the CPU bottleneck results in higher performance, less power consumption, and less bandwidth usage as compared to other related systems that involve the CPU.

Another benefit of the processing pipeline 300 is that there is no need to modify current OS, API, and hardware. The framework introduced in the processing pipeline 300 may include primarily three parts. First, the file mapping feature provided by the OS is used to swap the contents of a file into a memory block. Use of the file mapping function means that memory does not need to be allocated since the file is mapped to a memory space. After the file is mapped to a memory block, the OS may load the content asynchronously. Second, an API extension may be used to correlate the memory block to a graphics API buffer so the GPU 309 may indirectly access the file via the memory block. The advantage of this is that a buffer does not need to be created. Instead, the data on the storage may bind to the graphics API buffer. Third, building blocks for constructing GPU decoding algorithms are provided such that general decompression (e.g., unzip) may be performed parallelly on the GPU 309 to convert the encoded data to GPU consumable data. The benefit of this is to provide a flexible framework without any need to fixate on specific algorithms for a specific file type.

Since the GPU 309 is not optimized for rendering from a mapped host memory, rendering from mapped host memory may be slower than reading from video memory 307. Accordingly, the third part (e.g., the building blocks for constructing GPU decoding algorithms) is used to decode the content from mapped host memory 303 to video memory 307. Here, a GP GPU technique is configured to convert a serial CPU decoding algorithm into a parallel GPU algorithm. For instance, building blocks such as prefix-sum scan, sort, and match may be converted into a parallel GPU algorithm. After the data is decoded to video memory 307, the GPU 209 may use the decoded data.

A non-limiting example of a tool that may be used to create a buffer from an existing memory address or block is a Vulkan extension group. Vulkan is a graphics API that is used in mobile and personal computer/console game development. Vulkan extensions are supported by various platforms and may map existing memory into a Vulkan buffer. Specifically, in this non-limiting example using Vulkan extensions and with regard to the second part (e.g., correlating the memory block to a graphics API buffer), a Vulkan extension (e.g., VK_KHR_external_memory) may be used to correlate the memory block to a Vulkan buffer. This allows the GPU to indirectly access the file via the Vulkan buffer. On Windows, a second Vulkan extension called a memory host (e.g., VK_EXT_external_memory_host) may be used to create a buffer from an existing memory address. On Linux and Android, another Vulkan extension called a Memory FD (e.g., VK_KHR_external_memory_fd) may create a buffer from a file descriptor.

These extensions allow the file content to bind to a Vulkan buffer without an explicit copy. The Vulkan buffer is agnostic to how the memory is allocated. Instead, by default, a space is created in the Vulkan extension group as the buffer. This is in contrast to related systems where a buffer must be created before delivering data to the GPU. In these related systems, when data is delivered to a GPU, the data must first be placed in the buffer, copied, and then sent to the GPU. With this extension, an existing allocated buffer may bind to a Vulkan buffer such that data may be directly sent to the GPU for consumption.

Continuing with the non-limiting example using the Vulkan extensions, the Vulkan extension (e.g., VK_KHR_external_memory) used to correlate the memory block to the Vulkan buffer may include additional conditions for the memory. The first condition is that the memory be aligned to VkPhysicalDeviceExternalMemoryHostPropertiesEXT:: minImportedHostPointerAlignment. The second condition is that the size of the memory is a multiple of the alignment value. The third condition is that the memory status be in READ and WRITE mode even if the memory is only being read from. On Windows, the memory address from file mapping automatically follows the first and second conditions. The third condition may be met when creating the file, creating the mapping, and getting the address.

In addition, related decompression algorithms are designed without consideration of parallelism. Accordingly, the data is decompressed serially. To increase the processing parallelism to take advantage of the parallel processing architecture of the GPU 309, the data may be reorganized into data chunks. For instance, the data may be reorganized into 4 Kb per data chunk. Each data chunk is encoded and decoded independently with customizable algorithms. Although a GPU may have millions of threads, they are organized into groups such that each group always runs a same instruction at a same time in a Single Instruction/ Multiple Data (SIMD) manner. A group is called a WARP. A WARP is a collection of threads that are executed simultaneously by streaming multiprocessors (SM). Each SM has a set of execution units, a set of registers and a chunk of shared memory. Multiple warps may be executed on an SM at once. On a GPU, the WARP may contain 16 to 128 threads depending on the hardware implementation.

Simply assigning a thread to decode a chunk will slow down the decoding due to branch divergence. Instead, a WARP is assigned to decode a chunk and data-parallelism is relied upon in some decoding steps. To minimize the interference between decoding chunks, the decode algorithm may be limited to only using in-WARP operations. Accordingly, WARP-based building blocks are provided in the framework for this purpose, which can also help implement parallel decoding procedurals. In some aspects, a parallelized unzip algorithm may be used as a default solution.

A few examples of WARP-based building block operations such as a prefix-sum scan, sort, and match will be described in more detail below. These WARP-based building blocks each play an important role for decoding algorithms and may be applicable to all types of compression and decompression scenarios.

A first WARP-based building block is a prefix-sum scan operation. In this framework, instead of adding a block-based shared memory, WARP shuffle functions are used for inter-thread data exchange within a WARP. The scan operation is important to convert a serial algorithm to a parallel algorithm and is particularly important when the output length of each thread is variable.

A second WARP-based building block is a sort operation. There may be two sorting algorithms. A first sorting algorithm is a radix sort on 32-bit integers. In the radix sort, the input data length may be less than or equal to the width of a WARP. A second sorting algorithm is a merge sort on arbitrary data type, which may be optimized for data length less than 512 elements. This sorting algorithm is based on a Merge Path and is adapted for WARP scenarios. Each thread in a WARP carries N elements such that the second sorting algorithm may sort (N*WARP size) elements in total. The sync operation and communications between threads may be modified to remain in-WARP.

Another WARP-based building block is a match operation. Many decompression algorithms use a match process to copy from previously decompressed data. For example, "Abcd" may be encoded to "Abcd a[D=5,L=9]" where D is a distance and L is a length. For instance, [D=5,L=9] corresponds to rewinding the pointer for 5 bytes and copy 9 bytes. In serial decompression, this is a trivial operation because the bytes are copied one by one. However, when parallelizing, more data may be copied at a time in parallel, but some bytes are generated during the copy. In this example, the first 5 bytes "bcd a" are copied because they are already there, but the next 4 bytes must be copied afterward. These 9 bytes cannot be copied at once in parallel. Hence, the algorithm is iterative. In every iteration, the [D,L] region is split into two—a non-overlap one [D, min(L,D)] and an overlap one [D+min(L,D), max(0,L−D)]. The non-overlap one can be copied directly such that the overlapped one becomes the new [D,L] region and the splitting is performed until L is less than or equal to D. In the above example, [D=5, L=9] is split into [D=5, L=5] and [D=10, L−4]. The non-overlap region can be copied in parallel. Then [D=10, L−4] becomes the non-overlap region and another copy will handle it. Every iteration doubles the non-overlap length. Hence, the parallelism doubles at every iteration.

The decoding building block operations described above are general and lossless. Any data such as video data, texture data, mesh data, neural network data, or text data may be handled by this framework. The framework may also be used on top of domain specific compression such as Adaptive Scalable Texture Compression (ASTC) texture compression or Draco geometry compression to provide a higher compression ratio. ASTC is a form of texture compression that uses variable block sizes rather than a single fixed size. ASTC is designed to effectively obsolete most prior compressed formats by providing all of the features of the others plus more in one format. Draco is a library for compressing and decompressing 3D geometric meshes and point clouds and is intended to improve the storage and transmission of 3D graphics. Furthermore, instead of one data per file, all game data can be put into a large file and a virtual file system may be used to manage the data. With this, an application can correlate a large file to GPU and then let the GPU load any data in it.

Accordingly, in processing pipeline 300, the GPU 309 is able to decode the data in parallel more efficiently than in processing pipelines 200a and 200b because there is no communication with the CPU. In addition, the GPU 309 is also able to transfer the data in a compressed form. This leads to higher performance, less power consumption, and less bandwidth usage than the processing pipelines 200a and 200b.

Figure 4:
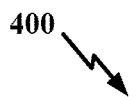
FIG. 4 illustrates a flowchart of an example method of a data loading at a computing device in accordance with one or more techniques of this disclosure.
Figure 4:
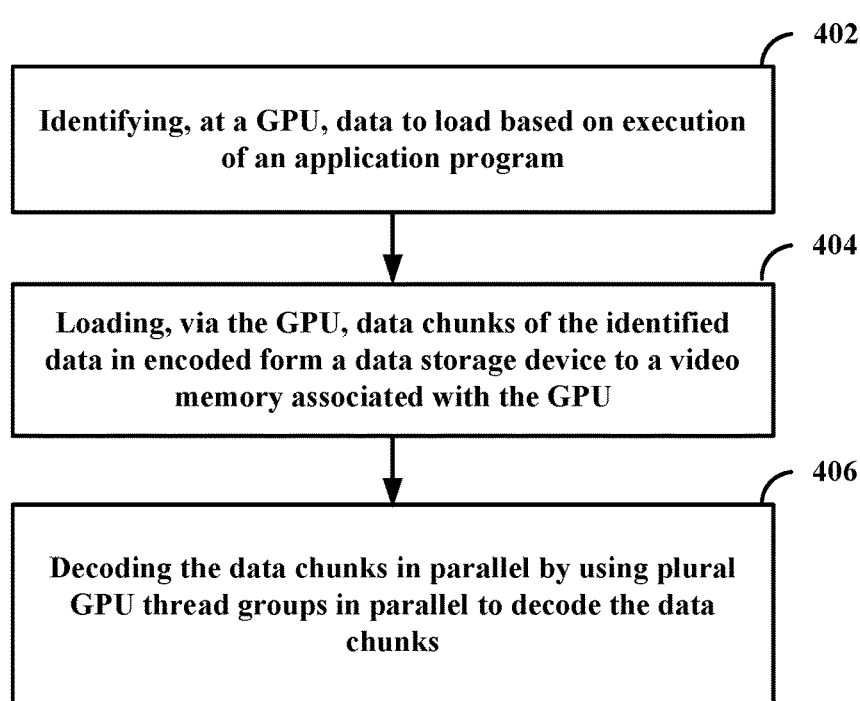

FIG. 4 illustrates a flowchart of various example methods of data loading at a computing device in accordance with one or more techniques of this disclosure. The method 400 may be performed by an apparatus, such as control component 198, as described above. In some implementations, the method 400 is performed by processing logic, including hardware, firmware, software, or a combination thereof. In some implementations, the method 400 is performed by a processor executing code stored in a non-transitory computer-readable medium (e.g., a memory). The method 400 includes loading data at a computing device.

At block 402, the method 400 includes identifying, at a GPU, data to load based on execution of an application program. In some aspects, the data may correspond to a video data, texture data, mesh data, neural network data, or text data. For example, referring back to FIG. 3, the GPU 309 is configured to decide which data to load based on execution of a application program in the decider function 317.

At block 404, the method 400 includes loading, via the GPU, data chunks of the identified data in encoded form from a data storage device to a video memory associated with the GPU. The identified data is organized into chunks during an offline (i.e., previously performed) compression phase. This organization of the data into data chunks allows the GPU to load the data chunks during runtime. In some aspects, loading the data to the video memory may include mapping a file of the data (e.g., one or more files of the data chunks) to a memory block; and associating the memory block mapped to the file of the data with a buffer using an application program interface (API) extension group. For example, referring back to FIG. 3, the GPU 309 is configured to load data in an encoded form from the hard drive 301 to the video memory 307 in the loader function 313.

At block 406, the method 400 includes decoding the data chunks in parallel by using plural GPU thread groups in parallel to decode the data chunks. Each of the data chunks is decoded independently of other data chunks. For example, referring back to FIG. 3, the GPU 309 is configured to decode the data chunks in parallel in the decoder function 315.

In some aspects, each of the plural GPU thread groups may decode a respective one of the data chunks independently of other data chunks by employing in-group decoding functions limited to using data from the respective thread group. In some aspects, decoding the data chunks in parallel may include decoding a first data chunk using a first GPU thread group of the plural GPU thread groups in parallel with and independently from decoding a second data chunk using a second GPU thread group of the plural thread groups. In some aspects, the in-group decoding functions may include a shuffle function that allows an inter-thread data exchange within one of the plural GPU thread groups. In some aspects, the in-group decoding functions may include a radix sort of one or more threads within one of the plural GPU thread groups, the radix sort having an input bit length that is less than or equal to a number of threads in one of the plural GPU thread groups. In some aspects, the in-group decoding functions may include a merge sort applicable to a maximum number of elements equal to a product of a number of elements in one thread and a number of threads in a GPU thread group. In some aspects, the in-group decoding functions may include a match operation that includes iteratively (i) copying a non-overlap region split from an overlap region of the data, and (ii) dividing the overlap region into a subsequent non-overlap region and a subsequent overlap region until a length of the subsequent overlap region is less than a distance of the subsequent overlap region.

The method 400 may include rendering the decoded data for visual representation. For example, referring back to FIG. 3, the GPU 309 is configured to consume the decoded data by rendering the decoded data for visual representation in the consume function 319.

The subject matter described herein can be implemented to realize one or more benefits or advantages. For instance, the techniques disclosed herein enable a method of data loading at a computing device where an identifying, reading, and decoding process is performed by the GPU rather than a CPU. As a result, the CPU bottleneck is bypassed to provide faster performance and lower latency. In addition, there is no need to modify current OS, API, hardware, drivers, or existing components to utilize the method. Furthermore, the techniques disclosed herein provide a flexible framework such that there is no need to rely on specific algorithm for particular file types.

The subject matter described herein can be implemented to realize one or more benefits or advantages. For instance, the described graphics processing and non-graphics processing techniques can be used by a server, a client, a GPU, or some other processor that can perform computer or graphics processing to implement the sharing techniques described herein. This can also be accomplished at a low cost compared to other computer or graphics processing techniques. Moreover, the computer or graphics processing techniques herein can improve or speed up data processing or execution. Further, the computer or graphics processing techniques herein can improve resource or data utilization and/or resource efficiency.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing unit may be implemented in hardware (e.g., by processing circuitry), software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware.

What is claimed is:

1. A method of data loading at a computing device including a central processing unit (CPU) and a graphics processing unit (GPU), the method comprising:
   identifying, by the GPU, data chunks to load from a plurality of candidate data chunks based on execution of an application program;
   bypassing the CPU by directly loading, by the GPU, the identified data chunks of the data in encoded form directly from a data storage device to a video memory that is separate from the data storage device;
   decoding, by the GPU, the data chunks in parallel by using plural GPU thread groups in parallel to decode the data chunks, wherein each of the data chunks is decoded independently of other data chunks; and
   processing, by the GPU, the decoded data chunks to render the decoded data for visual representation.

2. The method of claim 1, wherein each of the plural GPU thread groups decodes a respective one of the data chunks independently of other data chunks by employing in-group decoding functions limited to using data from the respective thread group.

3. The method of claim 2, wherein the decoding the data chunks in parallel includes decoding a first data chunk using a first GPU thread group of the plural GPU thread groups in parallel with and independently from decoding a second data chunk using a second GPU thread group of the plural thread groups.

4. The method of claim 2, wherein the in-group decoding functions include a shuffle function that allows an inter-thread data exchange within one of the plural GPU thread groups.

5. The method of claim 2, wherein the in-group decoding functions include a radix sort of one or more threads within one of the plural GPU thread groups, the radix sort having an input bit length that is less than or equal to a number of threads in one of the plural GPU thread groups.

6. The method of claim 2, wherein the in-group decoding functions include a merge sort applicable to a maximum number of elements equal to a product of a number of elements in one thread and a number of threads in a GPU thread group.

7. The method of claim 2, wherein the in-group decoding functions include a match operation that includes iteratively (i) copying a non-overlap region split from an overlap region of the data, and (ii) dividing the overlap region into a subsequent non-overlap region and a subsequent overlap region until a length of the subsequent overlap region is less than a distance of the subsequent overlap region.

8. The method of claim 1, wherein the directly loading the data chunks to the video memory includes:

mapping a file of the data to a memory block; and associating the memory block mapped to the file of the data with a buffer using an application program interface (API) extension group.

9. The method of claim 1, wherein the data chunks correspond to video data, texture data, mesh data, neural network data, or text data.

10. The method of claim 1, wherein the processing includes rendering the decoded data for the visual representation.

11. An apparatus for data loading at a computing device including a central processing unit (CPU) and a graphics processing unit (GPU), the apparatus comprising:

the GPU configured to:

identify data chunks to load from a plurality of candidate data chunks based on execution of an application program;

directly load the identified data chunks of data in encoded form directly from a data storage device to a video memory that is separate from the data storage device;

decode the data chunks in parallel by using plural GPU thread groups in parallel to decode the data chunks, wherein each of the data chunks is decoded independently of other data chunks; and process the decoded data chunks to render the decoded data for visual representation.

12. The apparatus of claim 11, wherein each of the plural GPU thread groups decodes a respective one of the data chunks independently of other data chunks by employing in-group decoding functions limited to using data from the respective thread group.

13. The apparatus of claim 12, wherein the GPU is configured to decode a first data chunk using a first GPU thread group of the plural GPU thread groups in parallel with and independently from a second data chunk using a second GPU thread group of the plural thread groups.

14. The apparatus of claim 12, wherein the in-group decoding functions include a shuffle function that allows an inter-thread data exchange within one of the plural GPU thread groups.

15. The apparatus of claim 12, wherein the in-group decoding functions include a radix sort of one or more threads within one of the plural GPU thread groups, the radix sort having an input bit length that is less than or equal to a number of threads in one of the plural GPU thread groups.

16. The apparatus of claim 12, wherein the in-group decoding functions include a merge sort applicable to a maximum number of elements equal to a product of a number of elements in one thread and a number of threads in a GPU thread group.

17. The apparatus of claim 12, wherein the in-group decoding functions include a match operation that includes iteratively (i) copying a non-overlap region split from an overlap region of the data, and (ii) dividing the overlap region into a subsequent non-overlap region and a subsequent overlap region until a length of the subsequent overlap region is less than a distance of the subsequent overlap region.

18. The apparatus of claim 11, wherein the GPU is configured to:

map a file of the data to a memory block; and associate the memory block mapped to the file of the data with a buffer using an application program interface (API) extension group.

19. The apparatus of claim 11, wherein the data chunks correspond to video data, texture data, mesh data, neural network data, or text data.

20. A non-transitory computer-readable storage medium storing instructions which when executed by a graphics processing unit (GPU) cause the GPU to perform:

identifying data chunks to load from a plurality of candidate data chunks based on execution of an application program;

bypassing a central processing unit (CPU) by directly loading the identified data chunks of data in encoded form directly from a data storage device to a video memory that is separate from the data storage device; and decoding the data chunks in parallel by using plural GPU thread groups in parallel to decode the data chunks, wherein each of the data chunks is decoded independently of other data chunks; and processing the decoded data chunks to render the decoded data for visual representation.

21. A device, comprising:

a controller in a graphics processing unit (GPU), the controller being configured to:

identify data chunks to load from a plurality of candidate data chunks based on execution of an application program;

bypass a central processing unit (CPU) by directly load the identified data chunks of data in encoded form directly from a data storage device to a video memory that is separate from the data storage device;

decode the data chunks in parallel by using plural GPU thread groups in parallel to decode the data chunks, wherein each of the data chunks is decoded independently of other data chunks; and process the decoded data chunks to render the decoded data for visual representation.

22. The device of claim 21, wherein each of the plural GPU thread groups decodes a respective one of the data chunks independently of other data chunks by employing in-group decoding functions limited to using data from the respective thread group.

23. The device of claim 22, wherein the controller is configured to decode a first data chunk using a first GPU thread group of the plural GPU thread groups in parallel with and independently from a second data chunk using a second GPU thread group of the plural thread groups.

24. The device of claim 22, wherein the in-group decoding functions include a shuffle function that allows an inter-thread data exchange within one of the plural GPU thread groups.

25. The device of claim 22, wherein the in-group decoding functions include a radix sort of one or more threads within one of the plural GPU thread groups, the radix sort having an input bit length that is less than or equal to a number of threads in one of the plural GPU thread groups.

26. The device of claim 22, wherein the in-group decoding functions include a merge sort applicable to a maximum number of elements equal to a product of a number of elements in one thread and a number of threads in a GPU thread group.

27. The device of claim 22, wherein the in-group decoding functions include a match operation that includes iteratively (i) copying a non-overlap region split from an overlap region of the data, and (ii) dividing the overlap region into a subsequent non-overlap region and a subsequent overlap region until a length of the subsequent overlap region is less than a distance of the subsequent overlap region.

28. The device of claim 22, wherein the controller is configured to:

map a file of the data to a memory block; and associate the memory block mapped to the file of the data with a buffer using an application program interface (API) extension group.

29. The device of claim 22, wherein the data chunks correspond to video data, texture data, mesh data, neural network data, or text data.

30. The device of claim 21, wherein the controller is further configured to render the decoded data for the visual representation.

* * * * *